(12) United States Patent
Huang et al.

(10) Patent No.: US 6,348,943 B1
(45) Date of Patent: Feb. 19, 2002

(54) DIGITAL NON-CONTACT BLADE POSITION DETECTION APPARATUS

(75) Inventors: Chien-Rong Huang; Chih-Yi Lai; Chien-Hsing Lin; Chun-Hung Liu, all of Hsin-Chu (TW)

(73) Assignees: Industrial Technology Research Institute, Hsinchu; Yang Iron Works Co., Ltd., Taichung, both of (TW)

( * ) Notice: Subject to any disclaimer, the term of this patent is extended or adjusted under 35 U.S.C. 154(b) by 0 days.

(21) Appl. No.: 09/182,629

(22) Filed: Oct. 30, 1998

(51) Int. Cl.$^7$ .............................. H04N 7/18; H04N 9/47
(52) U.S. Cl. ........................................... 348/94; 348/92
(58) Field of Search .............................. 348/94, 95, 92, 348/86, 87; 356/153, 154, 375; 250/548; H04N 7/18, 9/47

(56) References Cited

U.S. PATENT DOCUMENTS

| | | | | |
|---|---|---|---|---|
| 4,757,550 A | * | 7/1988 | Uga | 348/95 |
| 5,276,497 A | * | 1/1994 | Oono | 356/153 |
| 5,642,159 A | * | 6/1997 | Oba | 348/95 |
| 5,886,787 A | * | 3/1999 | Hercher | 356/375 |
| 6,191,429 B1 | * | 2/2001 | Suwa | 250/548 |

\* cited by examiner

*Primary Examiner*—Howard Britton
*Assistant Examiner*—Nhon T Diep
(74) *Attorney, Agent, or Firm*—Smith, Gambrell & Russell, LLP

(57) ABSTRACT

A digital non-contact blade position detection apparatus is provided for use on a wafer dicing machine for blade position detection so as to correct the position of the cutting blade. The apparatus includes a light source for generating a light beam; a light converging optical unit for converting the light beam from the light source to a preset converging point; light diverting means for diverting the beam light from the light converging optical unit to a preset optical path in which the blade is interdisposed; a light diverging optical unit for diverging the diverted light beam from the light diverting means; a CCD position detector, disposed at a third predetermined distance from the light diverging optical unit, for detecting a displacament of a diffractive part of the light beam passing through the optical path between the first and second that is partly blocked out by the blade; an analog-to-digital converter for converting the analog displacement signal from the CCD position detector into digital data; and computer means for processing the digital data to thereby determine the required correction in the position of the blade due to wear to the blade. This apparatus has the benefits of performing the blade position detection in a non-contact manner, enhancing the resolving power to submicron level; allowing the detection to be unaffected by alien particles; and performing the blade position detection with quick response and high precision.

16 Claims, 6 Drawing Sheets

DIGITAL NON-CONTACT BLADE POSITION DETECTION APPARATUS

BACKGROUND OF THE INVENTION

1. Field of the Invention

This invention relates to a blade position detection apparatus for wafer dicing machine used in the dicing of a material piece, such as a semiconductor wafer or a ceramic piece, and more particularly, to a digital non-contact blade position detection apparatus for use on a wafer dicing machine for blade position detection that can be used to correct the blade position of the cutting blade due to wear to the cutting blade.

2. Description of Related Art

In a wafer dicing machine, a rotating circular blade is used to cut a fabricated wafer apart into separate chips. After a long time of use, however, the cutting edge of the blade can be worn out, thus affecting the cutting depth into the wafer. As a result, the wafer would not be cut properly. A solution to this problem is to constantly measure the radius of the blade to accordingly correct the blade position. This solution, however, is inaccurate and can cause damage to the blade or the platform on which the wafer is fixed. Another solution is disclosed in European Patent No. 0532933A1 entitled "Blade Position Detection Apparatus". This patent is briefly described in the flowing with reference to FIGS. 4–6.

As shown in FIG. 4, the apparatus of European Patent No. 0532933A1 includes a pair of prisms 2, 3, a first lens system 5, a second lens system 6, a light source 4, a light sensor 7, and an analog control circuit 8. The blade 1 of the wafer dicing machine is interdisposed in the optical path 11 between the two prisms 2, 3. In operation, the light source 4 generates a light beam which is then successively guided through the first lens system 5, the first prism 2, the second prism 3, and the second lens system 6 to the light sensor 7. If the blade 1 is unworn, it will block out a certain amount of the fight beam transmitting from the first prism 2 to the second prim 3; and when the blade 1 is worn out, it will allow an increased amount of the light beam to pass therethrough to the second prism 3 if positioned at the same vertical position. Accordingly, the correction in position for the blade 1 can be obtained by first adjusting the blade 1 to a vertical position that allows the light sensor 7 to receive a predetermined fixed amount of light beam and then using the Z-as displacement detector 10 to measure the vertical displacement. The measured data can be then used to adjust the blade 1 to the suitable cutting position.

FIGS. 5A and 5B are two graphs used to explain the operation of the conventional blade position detection apparatus of FIG. 4, wherein FIG. 5A shows the V versus Z relationship, where V is the magnitude of the electrical voltage signal generated by the fight sensor 7 in response to the received light beam, and Z is the vertical displacement of the blade 1; and FIG. 5B shows the $\Delta V/\Delta Z$ versus Z relationship, where $\Delta V/\Delta Z$ is the rate of change of V with respect to Z. When the blade 1 is located at positions away from Za, the light beam 11 (shown here in cross section) between the prisms 2, 3 is entirely unblocked by the blade 1, thus allowing V to be at its maximum magnitude $V_0$; and at the position Zc, the blade 1 blocks nearly half of the light beam 11, thus making V to be reduced in half to $V_0/2$; and at the position Zb, the light beam 11 is entirely blocked by the blade 1, thus reducing V to 0. The voltage $V_0/2$ is selected as the threshold voltage for the error signal used in blade position correction One drawback to the foregoing apparatus of FIG. 4, however, is that, due to its analog method of processing the light signal, the precision of the blade position detection can be easily affected by external factors such as contamination to the optical components, changes in ambient temperature and humidity, and varieties in component characteristics. As illustrated in FIGS. 6A and 6B, alien particles reside in the optical path 11 between the first and second prisms 2, 3, they would block part of the light beam transmitting along the optical path 11, and as a result, would causes a shift in the threshold $V_0/2$ and a shift in the $\Delta V/\Delta Z$ versus Z curve toward Za. As a consequence, the precision of the blade position detection would be adversely affected. Besides, ambient scattering light intruding into the system can also adversely affect the precision of the blade position detection. Still moreover, the blade position detection by the foregoing apparatus of FIG. 4 is quite slow in response.

SUMMARY OF THE INVENTION

It is therefore an objective of the present invention to provide a digital non-contact blade position detection apparatus, which can perform the blade position detection digitally.

it is another objective of the present invention to provide a digital non-contact blade position detection apparatus, which can help enhance the resolving power of the blade position detection to the submicron level.

It is still another objective of the present invention to provide a digital non-contact blade position detection apparatus, which can perform the blade position detection by positing the blade always at a fixed position It is yet another objective of the present invention to provide a digital non-contact blade position detection apparatus, which can perform the blade position detection without being affected by ailed particles intruding into the optical system.

It is still yet another objective of the present invention to provide a digital non-contact blade position detection apparatus, which can perform the blade position detection with quick response and high precision.

In accordance with the foregoing and other objectives of the present invention, a new digital non-contact blade position detection apparatus is provided. The apparatus of the invention includes the following constituent elements:

a light source for generating a light beam;

a light converging optical unit for converting the light beam from the light source to a preset converging point;

light diverting means for diverting the beam light from the light converging optical unit to a preset optical path in which the blade is interdisposed, with the blade being interdisposed between a pair of prims at a first predetermined distance from the converging point of the light beam passing through the light converging optical unit;

a light diverging optical unit, disposed at a second predetermined distance from the position where the blade is disposed, for diverging the diverted light beam from the second prism;

a CCD position detector, disposed at a third predetermined distance from the light diverging optical unit, for detecting a displacament of a diffractive part of the light beam passing through the optical path between the first and second prisms that is partly blocked out by the blade;

an analog-to-digital converter for converting the analog displacement signal from the CCD position detector into digital data; and computer means, king the digital data from the analog-to-digital converter as inputs, for determining accordingly the required correction in the position of the blade due to wear to the blade.

The foregoing apparatus of the invention has the benefits of performing the blade position detection in a digital manner, enhancing the resolving power of the blade position detection to the submicron level; allowing the detection to be unaffected by alien particles; and performing the blade position detection with quick response and high precision.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

A preferred embodiment of the digital non-contact blade position detection apparatus of the invention is disclosed in fill details in the following with reference to FIGS. 1 through 3.

Figure 1:
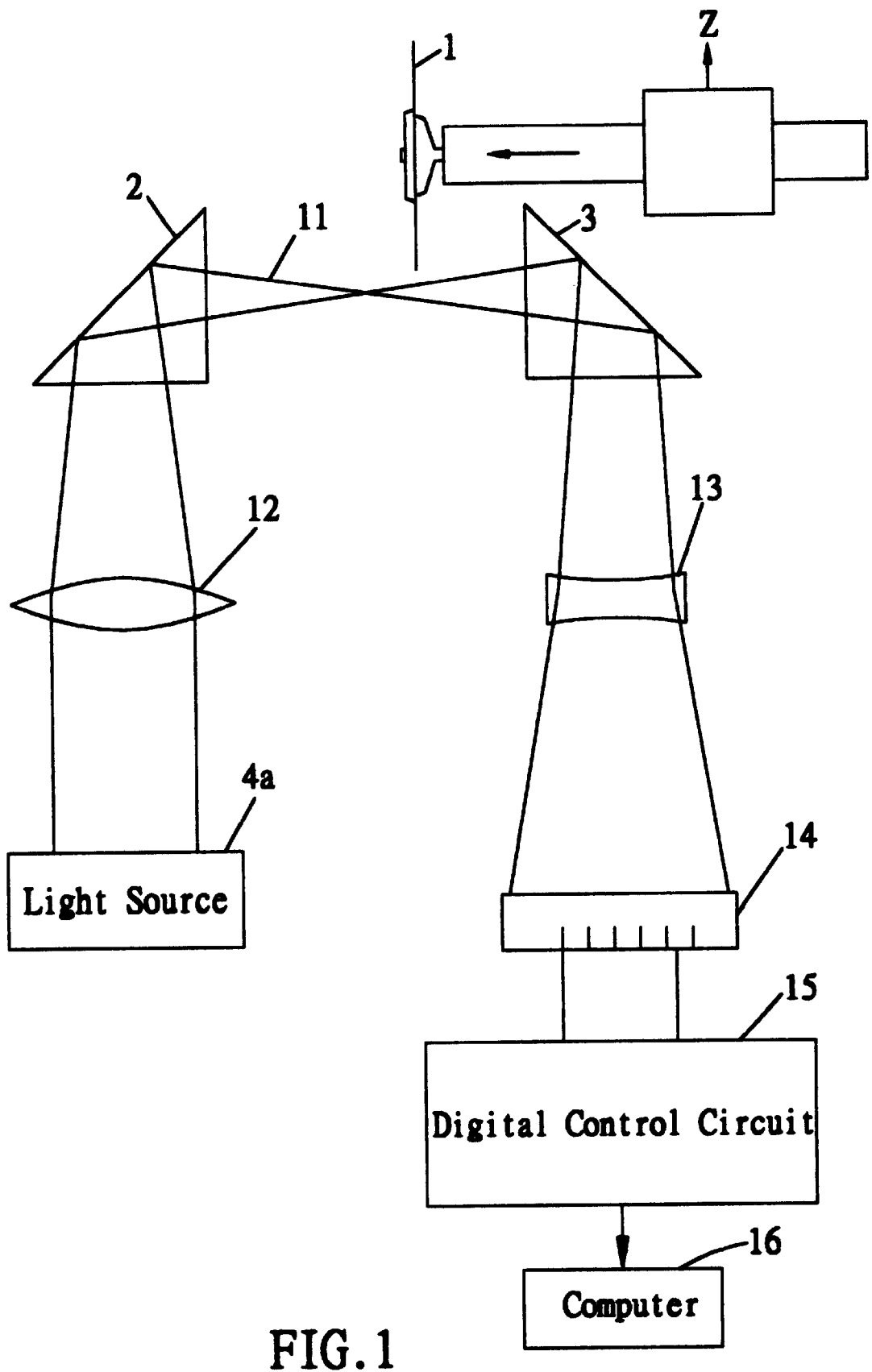
FIG. 1 is a schematic diagram showing the system configuration of the digital non-contact blade position detection apparatus of the invention.

FIG. 1 is a schematic diagram showing the system configuration of the digital non-contact blade position detection apparatus of the invention. As shown, the apparatus of the invention is utilized to detect the weariness to a blade 1 in terms of the radius of the blade 1. The apparatus of the invention includes a light source 4a such as a laser diode (LD), a light converging optical unit such as a convex lens 12, a first prism 2, a second prism 3, a light diverging optical unit such as a concave lens 13, a position detector 14 such as a charge-coupled device (CCD), a digital controller 15 such as an analog-to-digital converter, and a data processing means such as a computer 16. The apparatus of the invention is installed in such a manner as to let the blade 1 interpose in the optical path 11 between the first and second prisms 2, 3. The rotating axis of the blade 1, however, is always fixed.

In operation, the light source 4a generates a light beam, such as a laser beam. The light beam is then converged by the convex lens 12, subsequently diverted by the first prism 2 to the optical path 11 and then diverted by the second prism 3 to the concave lens 13. In the optical path 11, the light beam is partly blocked out by the edge of the blade 1. The light beam passing through the concave lens 13 then strikes on the CCD position detector 14. In response, the CCD position detector 14 generate a diffractive pattern signal. The displacement of the diffractive pattern signal of a wornlade to a new blade is then converted to digital data by the digital controller 15. The output data from the digital controller 15 can then be processed by the computer 16 to obtain the worn amount of the edge of the blade 1. Then, it can then be used to correct the position of the blade 1 when cutting a wafer.

Figure 2:
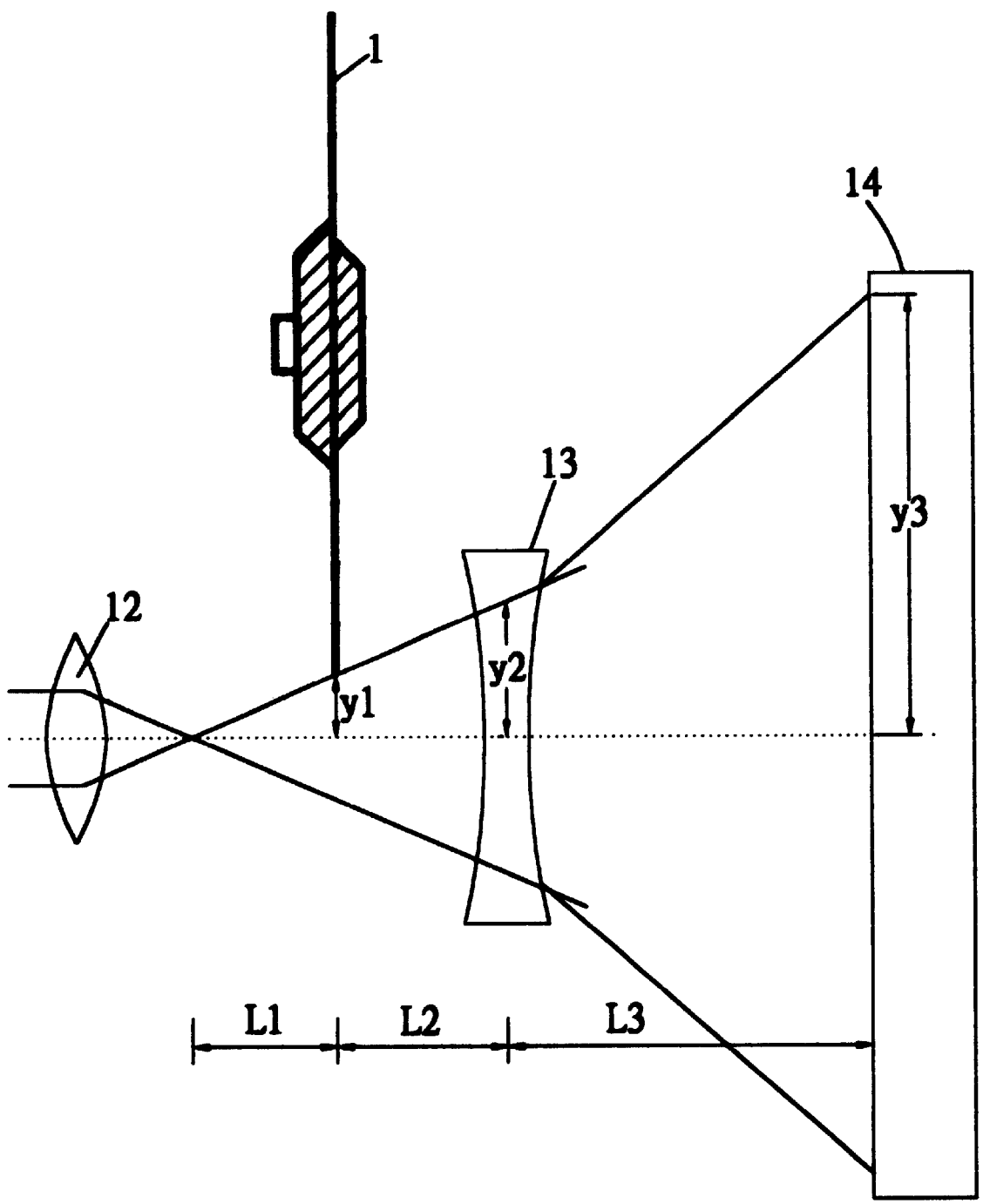
FIG. 2 is a schematic diagram used to depict how the apparatus of the invention can increase the resolving power to the detection on the weariness to the blade.

FIG. 2 is a schematic diagram used to depict how the apparatus of the invention can increase the resolving power to the detection on the weariness to the blade 1. In FIG. 2, the first and second prisms 2, 3 are eliminated since they are only used for light diverting purpose.

As shown, acme the outermost rim of the blade 1 is a distance y, away from the optical axis between the convex lens 12 and the concave lens 13; the blade 1 is a distance $L_1$ away from the converging point of the light beam passing through the convex lens 12 and a distance $L_2$ away from the concave lens 13; the concave lens 13 is a distance $L_3$ away from the CCD position detector 14. Further, assume the illuminated area on the CCD position detector 14 by the light beam passing through the concave lens 13 has a radius $y_3$.

Based on the foregoing assumptions, the amplification ratio ms of the light beam at the concave lens 13 with respect to the it beam at the blade 1 can be obtained as follows:

$$ms = \frac{y_2}{y_1} = \frac{L_1 + L_2}{L_1}$$

Further, the amplification ratio mL of the light beam striking on the CCD position detector 14 with respect to the light beam at the concave lens 13 can be obtained as follows:

$$mL = \frac{y_3}{y_2} = \frac{|f_0| + L_3}{|f_0|} = 1 + \frac{L_3}{|f_0|}$$

Where $f_0$ is the focal length of the concave lens 13 and is a negative value.

Accordingly, the overall amplification ratio M of the light beam striking on the CCD position detector 14 with respect to the light beam at the blade 1 can be obtained as follows:

$$M = ms * mL = \left(1 + \frac{L_2}{L_1}\right) * \left(1 + \frac{L_3}{|f_0|}\right)$$

In the case of $L_1$=5 cm, $L_2$=5 cm, $L_3$=9 cm and $f_0$=−1 cm,

M=(1+5/5)*(1+9/|−1|)=20

Therefore, in the case of the CCD position detector 14 having a line resolution of 14 $\mu$m (micrometer), which is defined as the separating distance between neighboring pixels, its resolving power is 14/20=0.7 $\mu$m Therefore, the resolving power of the CCD position detector 14 can be adjusted simply by adjusting the parameters $L_1$, $L_2$, $L_3$, and $f_0$ to suitable values.

Figure 3:
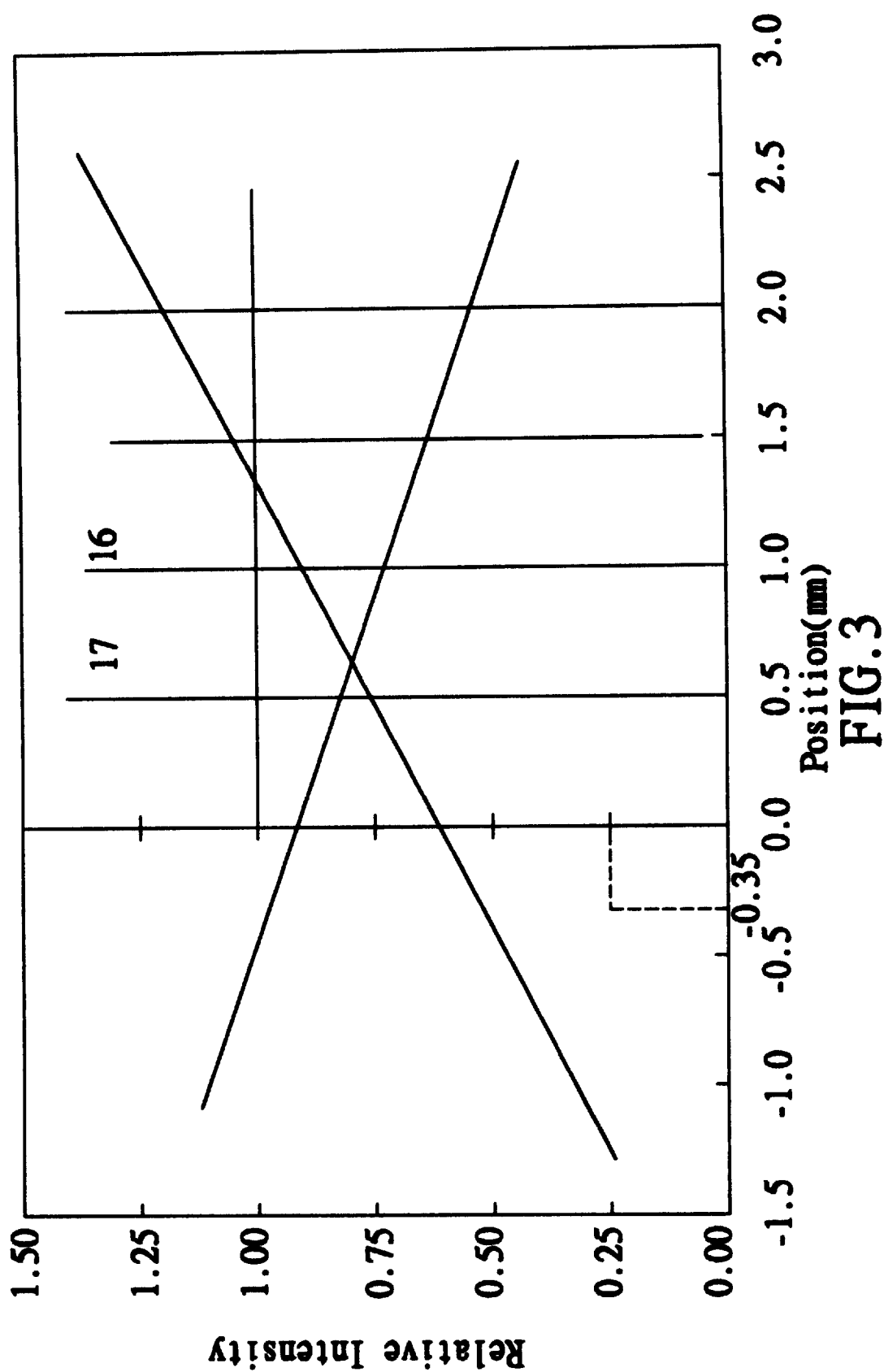
FIG. 3 is a graph, showing the relative intensity versus position plot obtained by the apparatus of the invention.
Figure 4:
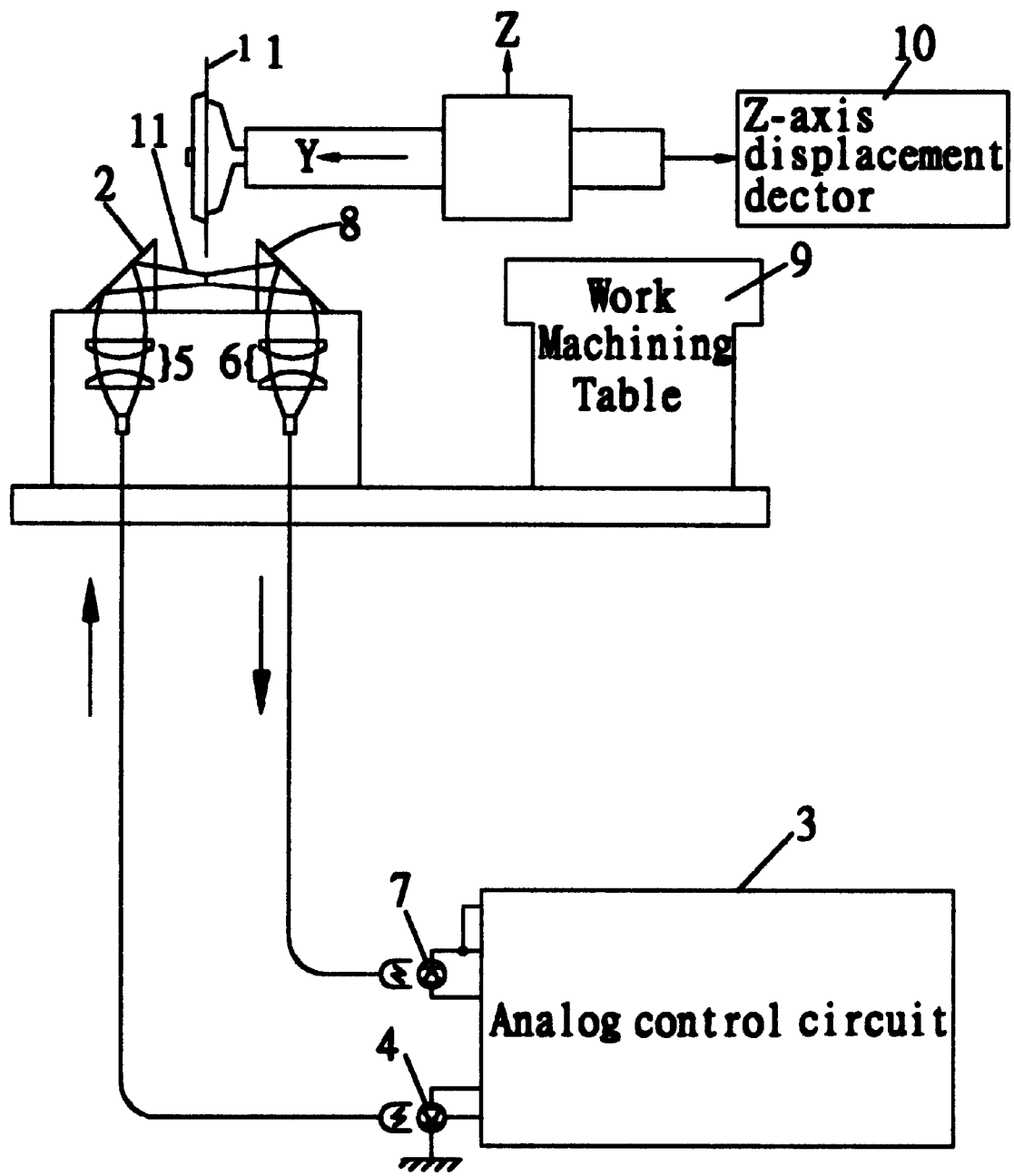
FIG. 4 is a schematic diagram showing the system configuration of a conventional blade position detection apparatus.
Figures 5A, 5B:
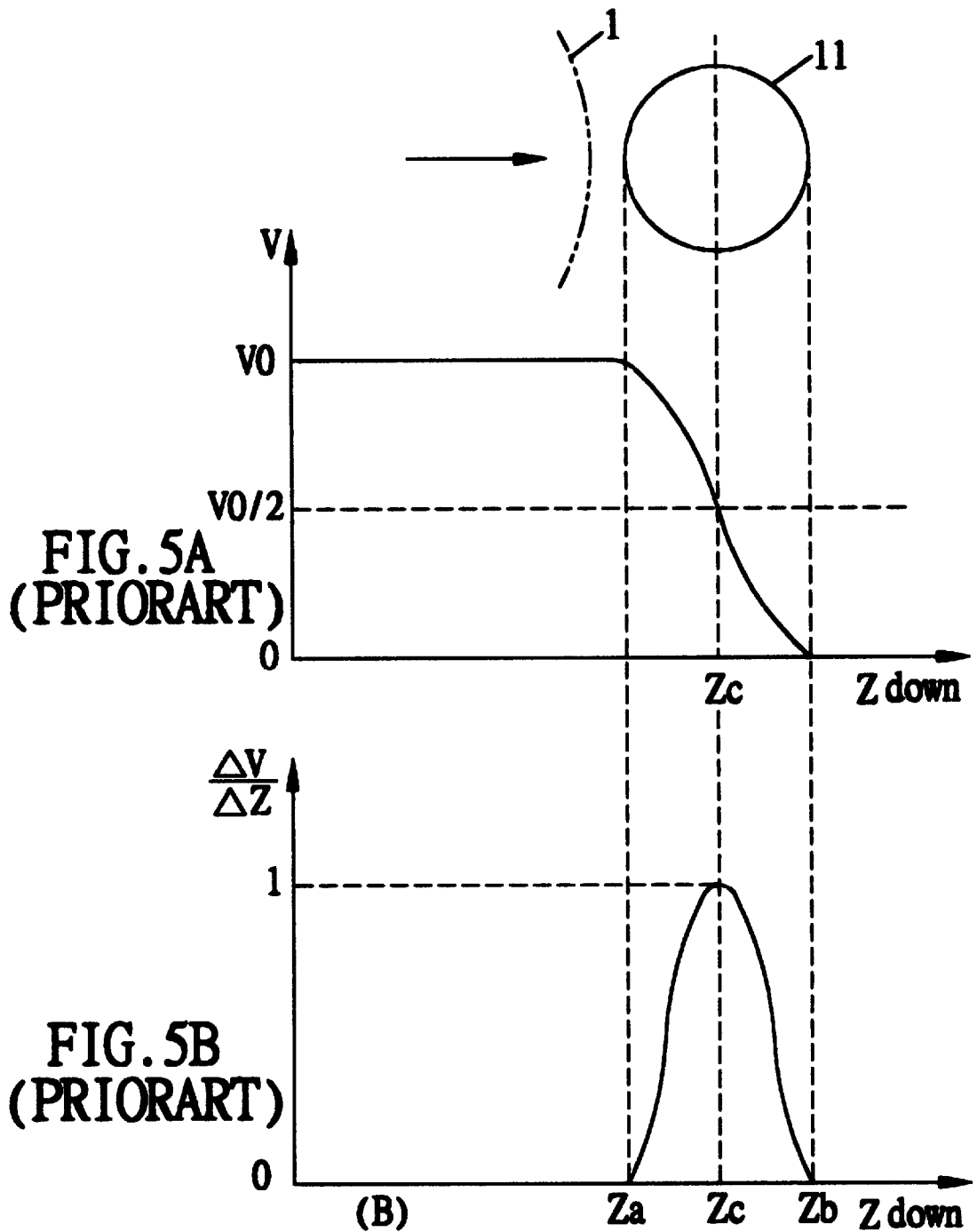
FIGS. 5A and 5B are two graphs used to explain the operation of the conventional blade position detection apparatus of FIG. 4.
Figures 6A, 6B:
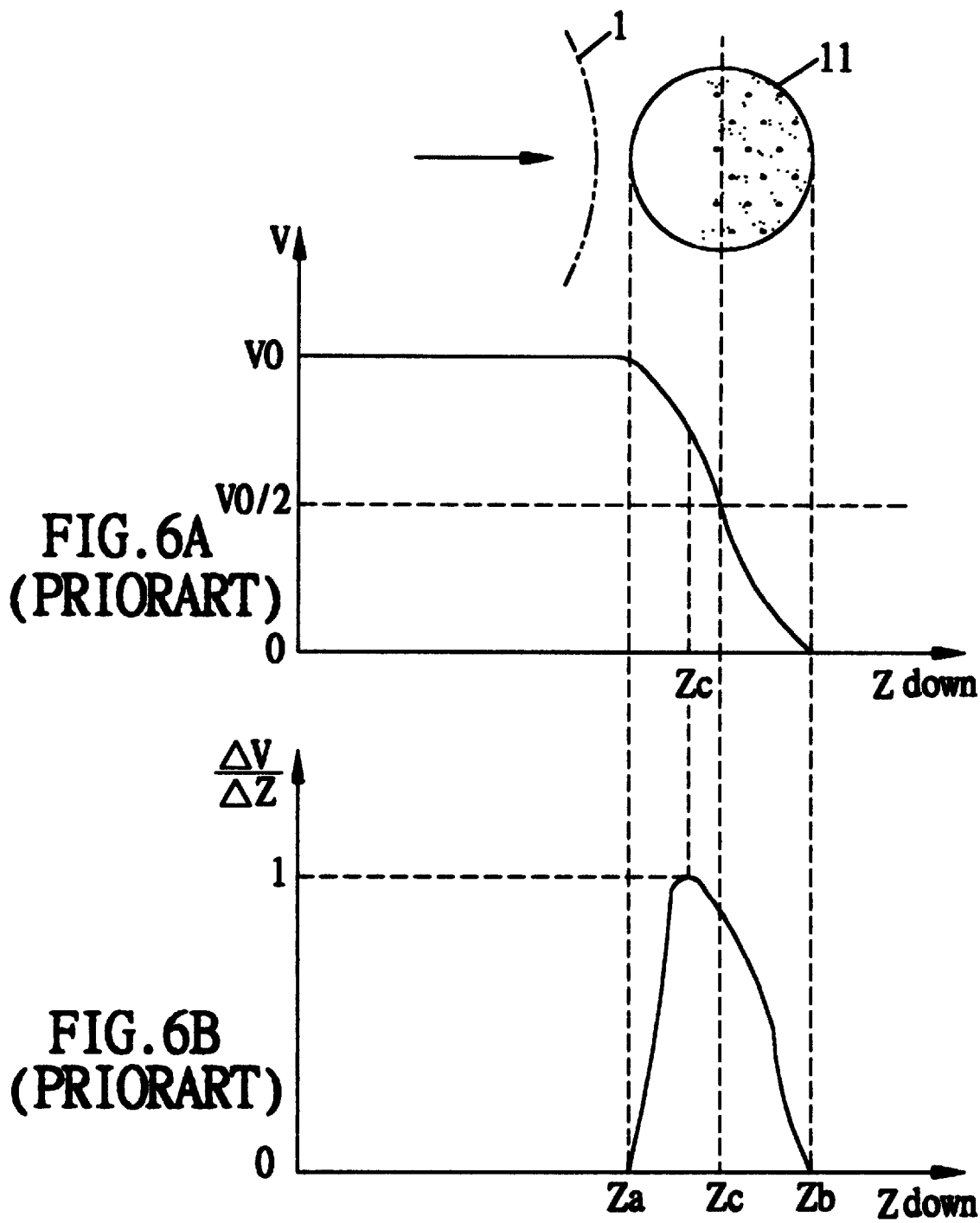
FIGS. 6A and 6B are two graphs used to explain the operation of the conventional blade position detection apparatus of FIG. 4.

FIG. 3 is a graph showing the relative intensity versus position plot obtained by the apparatus of the invention. In this graph, assume the solid plot indicated by the reference numeral 16 represents the characteristic plot of a new blade; and assume the dashed plot indicated by the reference numeral 17 represents the characteristic plot of the same blade after being worn to a certain extent. In this graph, it can be seen that the plot 17 is shifted from the plot 16 by a displacement of 0.35 mm to the left. This data, which is digitized, can then be used to obtain the required correction in the position of the worn blade.

In the foregoing apparatus, the convex lens 12 can be instead a set of convex and concave lenses that can converge the light beam in the desired manner; and the concave lens 13 can be instead a set of convex and concave lenses that can diverge the light beam in the desired manner. Moreover, the CCD position detector 14 can be either a linear CCD device or a 2-dimensional (2D) CCD device. The convex lens 12 and the concave lens 13 are intended to increase the resolving power of the light beam by the CCD position detector 14. If the CCD position detector 14 is already good enough in resolving power, the convex lens 12 and the concave lens 13 can be eliminated, and thus they are not essential elements to the combination of the invention.

In conclusion, the invention provides a digital non-contact blade position detection apparatus which has the benefits of performing the blade position detection in a digital manner, enhancing the resolving power of the blade position detection to the submicron level; performing the blade position detection at a fixed position; allowing the detection not to be affected by alien particles; and performing the blade position detection with quick response and high precision.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A digital non-contact blade position detection apparatus for detecting the position of a blade, which comprises:

a light source for generating a light beam;

a light converging optical unit for converting the light beam from the light source;

light diverting means for diverting the beam light from the light converging optical unit to a preset optical path in which the blade is interdisposed, with the blade being interdisposed at a first predetermined distance from the converging point of the light beam passing through the light converging optical unit;

a light diverging optical unit, disposed at a second predetermined distance from the position where the blade is disposed, for diverging the diverted light beam from the light diverting means;

a CCD position detector, disposed at a third predetermined distance from the light diverging optical unit, for detecting a displacement of a diffractive part of the light beam passing through the optical path between first and second prisms that is partly blocked out by the blade;

an analog-to-digital converter for converting the analog displacement signal from the CCD position detector into digital data; and computer means, taking the digital data from the analog-to-digital converter as inputs, for determining accordingly the required correction in the position of the blade due to wear to the blade.

2. The apparatus of claim 1, wherein the light source is a laser diode.

3. The apparatus of claim 1, wherein the light converging optical unit is a convex lens.

4. The apparatus of claim 1, wherein the light diverging optical unit is a concave lens.

5. The apparatus of claim 1, wherein the light diverting means includes said first and second prisms, with the range therebetween defining the preset optical path in which the blade is interposed, the first prism being used to divert the converged light beam from the light converging optical unit to the optical path, and the second prism being used to divert the light beam from the first prism to another optical axis.

6. The apparatus of claim 1, wherein the position detector is a CCD device.

7. The apparatus of claim 1, wherein the light converging optical unit is a set of convex lenses and concave lenses.

8. The apparatus of claim 1, wherein the light diverging optical unit is a set of convex lenses and concave lenses.

9. The apparatus of claim 6, wherein the position detector is a linear CCD device.

10. The apparatus of claim 6, wherein the CCD device is a 2D CCD device.

11. A digital non-contact blade position detection apparatus for detecting the position of a blade, which comprises:

a light source for generating a light beam;

light diverting means for diverting the beam light from the light source to a preset optical path in which the blade is interdisposed;

a CCD position detector for detecting a displacement of a diffractive part of the light beam passing through the optical path between first and second prisms that is partly blocked out by the blade;

an analog-to-digital converter for converting the analog displacement signal from the CCD position detector into digital data; and computer means, taking the digital data from the analog-to-digital converter as inputs, for determining accordingly the required correction in the position of the blade due to wear to the blade.

12. The apparatus of claim 11, wherein the light source is a laser diode.

13. The apparatus of claim 11, wherein the light diverting means includes said first and second prisms, with the range therebetween defining the preset optical path in which the blade is interposed, the first prism being used to divert the converged light beam from the light converging optical unit to the optical path, and the second prism being used to divert the light beam from the first prism to another optical axis.

14. The apparatus of claim 11, wherein the position detector is a CCD device.

15. The apparatus of claim 11, wherein the CCD device is a linear CCD device.

16. The apparatus of claim 11, wherein the CCD is a 2D CCD device.

* * * * *